US005112072A

United States Patent [19]

Korosue

[11] Patent Number: 5,112,072

[45] Date of Patent: May 12, 1992

[54] WHEELCHAIR FOR SINGLE-HAND OPERATION

[76] Inventor: Akira Korosue, 19-6-604 Tashiro-cho, Nishinomiya, Hyogo, Japan

[21] Appl. No.: 642,803

[22] Filed: Jan. 18, 1991

[30] Foreign Application Priority Data

Jan. 19, 1990 [JP] Japan .................................... 2-9586

[51] Int. Cl.[5] ............................................. B62M 1/16

[52] U.S. Cl. .................................... 280/240; 280/244; 280/250.1; 280/270; 280/304.1

[58] Field of Search ..................... 280/211, 240, 242.1, 280/243, 244, 249, 250.1, 263, 270, 304.1, 78

[56] References Cited

U.S. PATENT DOCUMENTS 2,643,898 6/1953 Everest et al. ...................... 280/240
4,506,900 3/1985 Korosue ............................. 280/244
5,020,815 6/1991 Harris et al. ........................ 280/270

*Primary Examiner*—Mitchell J. Hill
*Attorney, Agent, or Firm*—Koda and Androlia

[57] ABSTRACT

A wheelchair operable with one hand including operation ring, extension arm and interlocking member. The operation ring is attached to a yoke of universal joint that is axially rotatable and installed between the operation ring and one of the driving wheels of the wheelchair. The extension arm is connected to the yoke at its base end and to the interlocking member, that is linked to one of front casters of the wheelchair, at its front end. The oscillation movement of the extension arm that is made via the operation ring and universal joint is converted into a pivotal movement of the interlocking member that changes the direction of the front caster.

3 Claims, 1 Drawing Sheet

WHEELCHAIR FOR SINGLE-HAND OPERATION

BACKGROUND OF THE INVENTION

1. Field of the Invention

The present invention relates to a wheelchair for single-hand operation that can be classified into several different kinds of operation methods and is capable of moving forward and backward and controlling the moving direction with one hand.

2. Prior Art

There are several different kinds of wheelchairs that can be operated with a single hand. One type that is generally used is made such that the moving direction is controlled by individually operated driving wheels on both sides with double rings established on the working-hand-side of the wheelchair. This makes it very difficult to simultaneously apply individual movement to each wheel; therefore, it is impossible to change directions smoothly. Transmission of power to the driving wheel which is on the opposite side of the working-hand side via a joint is not very efficient, resulting in a poor balance between the left and right driving wheel and adding to the difficulty of operation. As a result, experience and skills are required for smooth operation of the wheelchair.

Another type of wheelchair employs an operation lever on the working-hand side linked with a mechanism using a one-way clutch (one-way drive clutch) that switches between forward and backward movements. This type employs another lever established at the tip of the operation lever, which activates a caster yoke linked with a caster wheel, to change the moving directions. While this type excels in direction-changing performance, it requires a switching operation between forward and backward movements. As such, there is merit and demerit in both types mentioned above.

Still another type of wheelchair was invented by the applicant of the present invention and was patented in Japan as Japanese Patent No. 1,330,760. This type employs a single operation lever that drives both left and right driving wheels and a differential link mechanism that applies a driving difference to change moving directions. In this wheelchair, switching between forward and backward movements is automatically performed across the neutral position, and the clutch also functions as a brake to make the operation quite easy. The operation lever has only to be moved in the intended direction. This type requires minimum skill; therefore, it is especially suitable for physically weak people who have poor judgment.

The lever-operated wheelchair, on the other hand, is somewhat difficult for a ring-type wheelchair user because of its rather awkward shape, thus a ring-type wheelchair which is easy to operate is desirable.

SUMMARY OF THE INVENTION

The present invention has been conceived in the light of the above-mentioned points with the purpose of providing a ring-type wheelchair for single-hand operation that enables direction change and switching between forward and backward movement with a single operation ring.

In order to achieve the above-mentioned purpose, the wheelchair for single-hand operation of the present invention employs a universal joint that is established on the drivingwheel axis and outside the driving wheels, and an operation ring fastened at shaft end of an outside yoke of the universal joint; and at the yoke shaft part, which is between the universal joint and the operation ring, the base of an extension arm that extends forward is established and supported such that the yoke shaft part can freely rotate, wherein the front end of the extension arm and the yoke of the direction-changing caster at the front of the wheelchair are linked via an interlocking member that converts oscillation movement along the front-rear direction axis into direction change movement of the caster.

For the above-mentioned interlocking member, it is preferable to arrange such that the bottom part of an elbow, which extends downwardly from the front end of the extension arm (that has a front end supported by a supporting member provided on the wheelchair frame), and one side of caster yoke are linked via a ball joint and a connecting bar which is supported at one end by the joint.

When the wheelchair is moved forward or backward by rotating the operation ring on the working-hand side while sitting on the single-hand operation wheelchair as constructed above, the movement of the operation ring is divided into two elements: an oscillation element pivoted on a front-rear direction axis at the universal joint part, and a rotational element centered around the outside yoke of the universal joint. The oscillation element (or oscillation movement) oscillates the direction-changing caster via the extension arm and interlocking member so as to change the moving directions of the caster, and the rotational element is transmitted to the driving wheel via the universal joint so as to move the wheelchair forward or backward. As such, the operation of the single operation ring can change the directions and provide forward and backward driving forces. Because of this mechanism, the top part of the operation ring is moved left or right, for example, so as to cause the oscillation movement in relation to the forward-/backward moving direction to change the directions of the wheelchair while moving forward or backward.

DETAILED DESCRIPTION OF THE INVENTION

Figure 3:
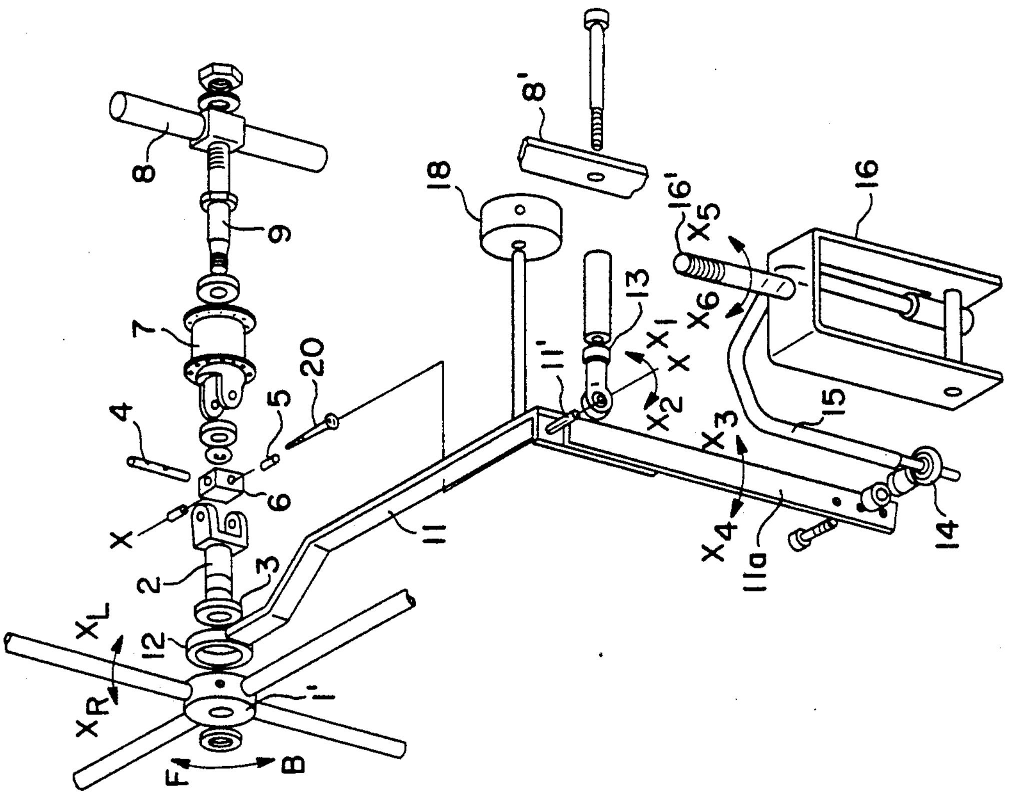
FIG. 3 is an exploded diagonal view of the mechanism employed in the wheelchair of the present invention.
Figure 2:
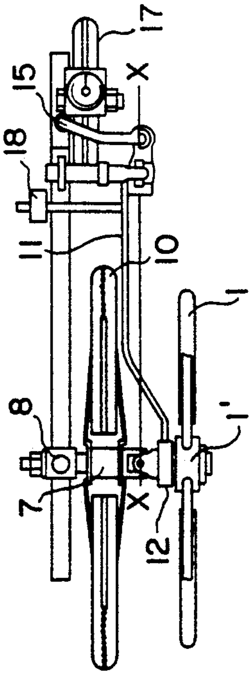
FIG. 2 is a partial top view of the main part of the wheelchair of FIG. 1.
Figure 1:
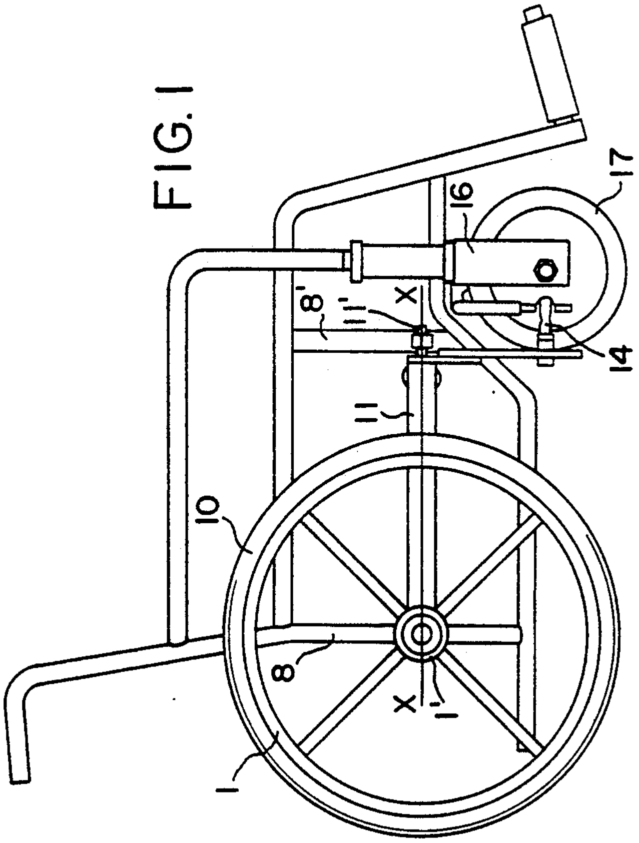
FIG. 1 is a side view of the wheelchair for right-hand operation in accordance with the present invention.

An embodiment of the present invention will now be described with reference to the accompanying drawings. FIG. 1 is a side view of a wheelchair for right-hand use, FIG. 2 is a partial plan view showing the main mechanism of the right-hand side of the wheelchair of FIG. 1, and FIG. 3 is an exploded diagonal view of the mechanism.

A boss 1' at the center of the operation ring 1 and a yoke 2 on the outside of the universal joint are fastened so as to grasp a bearing 3 that supports the rear end of an extension arm 11 later defined. The yoke 2, cross pin 4, cross pin 5, cross block 6, yoke hub 7, and joining screw 20 constitute a universal joint. The yoke hub 7 is fit rotation-freely into a hub shaft 9, which is screwed to a wheelchair frame 8, and joined concentrically to the driving wheel 10.

A holder 12, which is fastened to the rear end of the extension arm 11 that extends forward, is fit into the bearing 3, and a pin 11', which is established at the front end of the extension arm 11, is fit into a shaft coupling 13 that is established so as to protrude from the wheelchair frame 8'. This structure limits the operation ring 1 to oscillate over the X—X axis that connects the universal joint and the pin 11'. This result, the rotational element (or rotational movement of the operating ring 1) is transmitted smoothly to the driving wheel 10 via the universal joint, even if the center lines of the yoke 2 and hub shaft 9 are not precisely aligned.

At the front end of the extension arm 11, an elbow **11*a* is fastened below the pin 11', and at a ball joint 14 that is established at the tip (or the bottom end) of the elbow, one end of a U arm 15, which is formed in the reversed U shape ( ) so as to grasp the caster wheel 17, is connected. The other end of the arm 15 is mounted rotation-freely at the rear lower part of the caster yoke 16 that is not on the axis of rotational shaft 16' of the caster yoke 16. Therefore, when the elbow 11*a* oscillates to the left and right about the pin 11', such left and right movements are transmitted to the part linking the U arm 15 and the rear lower part of the yoke 16 (which is pivoted on the axis of the rotary shaft 16' of the caster yoke 16) via the ball joint 14 and U arm 15, thus oscillating the caster yoke 16**.

In operation, if the operation ring 1 is moved in the $X_R$ direction in FIG. 3, the elbow **11*a*, which is fastened perpendicularly to the tip of the arm 11, is rotated pivotally on the X—X axis in the directions of $X_1$ and $X_3$, and the caster yoke 16 is rotated in the directions of $X_6$ via the ball joint 14 (established at the lower part of the elbow 11*a* at the front end of the extension arm 11) and the U arm 15. The ball joint 14 absorbs the difference between the complicated activation conditions of the extension arm 11 and U arm 15, transmitting necessary elements (or movements) to the caster. As such, the oscillation movement of the operation ring 1 is transmitted to the caster wheel 17** to control the moving direction.

In this case, the movement of the F-B direction of the rotation element (or rotational movement) of the operation ring 1 as shown in FIG. 3 can be efficiently transmitted to the driving wheel 10 even if the oscillation angel varies.

Since there are different types of universal joints, the functions are not necessarily restricted to the one shown in the embodiment.

Also in this embodiment, the ball joint 14 and U arm 15 that are established on the elbow **11*a* at the front end of the extension arm 11 are used as an interlocking member that converts the oscillation movement of the extension arm 11** along the front-rear direction axis into the direction-changing movement of the caster, but this structure does not exclude the possibility of the use of other means such as bevel gears, etc.

Due to the structure of the embodiment in which the operation ring is installed on the left-hand side of the front-rear direction X—X axis (when viewed from the front of the wheelchair), the weight of the operation ring 1 forces the user to incline in the $X_R$ direction on the right-hand side when move to the right. In order to cope with a variety of force-applying modes by different users, a balance weight 18 can be added, or adjustment can be made using a spring.

As described above, according to the invention, the moving direction of the wheelchair can be changed by slanting the operation ring to either left or right, which activates the caster wheels. This makes operation easy and skill almost unnecessary.

Furthermore, according to the invention. the oscillation movement around the front-rear direction axis of the extension arm which is caused by slanting operation of the operation ring is converted into the direction-changing movement of the casters via the interlocking member (which consists of the ball joint and connecting bar linked to the front end of the extension arm). Therefore, the moving direction of the wheelchair is effortlessly and smoothly controlled by the caster wheels.

I claim:

1. A wheelchair capable of moving forward and backward for single-hand operation comprising at least one driving wheel, a universal joint provided on an axis of said one driving wheel and outside the one driving wheel, said universal joint including a yoke, a single operation ring fastened at a shaft end of said yoke, and a forwardly extending extension arm with a base of said extension arm provided and supported at the shaft end of the yoke between the universal joint and the operation ring such that said shaft end of the yoke can rotate freely, a direction-changing caster provided at a front of the wheelchair, and an interlocking member that converts oscillations over a front-rear axis of the extension arm into direction changes of said direction-changing caster, through which interlocking member a front end of the extension arm and a yoke of the direction-changing caster are linked with each other, whereby said wheelchair is not only driven by rotating said single operation ring but also steered by swaying said operation ring to a right and a left.

2. A wheelchair for single-hand operation in accordance with claim 1, wherein a bottom part of an elbow that extends downwardly from the front end of the extension arm, a front part of the extension arm which is supported by a supporting member provided on a wheelchair frame, and one side of the yoke of the direction-changing caster are linked via a ball joint and U-arm, one end of said U-arm being supported by the ball joint.

3. A wheelchair capable of moving forward and backward and operable with one hand comprising:

- at least one driving wheel for said wheelchair, said driving wheel having a hub,
- a universal joint that is connected to said hub of said one driving wheel,
- a single operation ring attached to a yoke of said universal joint, said universal joint being installed between said one driving wheel and said operation ring,
- an extension arm connected to said yoke at its base end, a front end of said extension arm being connected to a portion of a front frame of said wheelchair;
- an elbow member suspended from said front end of said extension arm;
- a ball joint provided at a bottom end of said elbow member; and
- a U-arm connected at one end to said ball joint and at an other end to a caster yoke rotatably mounted to said wheelchair a caster wheel in said caster yoke proved therein is turned to change the direction of said caster by said U-arm which is pivoted via said ball joint, elbow member and extension arm when said operation ring is swayed by way of said universal joint; whereby said wheelchair is not only driven by rotating said single operation ring but also steered by swaying said operation ring to a right and a left.

* * * * *